United States Patent [19]

Takamatsu et al.

[11] Patent Number: 5,063,557
[45] Date of Patent: Nov. 5, 1991

[54] DISC DRIVE APPARATUS

[75] Inventors: Ryoji Takamatsu, Kanagawa; Osamu Naitou, Tokyo; Hiroyuki Urushibata, Kanagawa; Masahiro Sato, Iwate, all of Japan

[73] Assignee: Sony Corporation, Tokyo, Japan

[21] Appl. No.: 364,122

[22] Filed: Jun. 12, 1989

[30] Foreign Application Priority Data

Jun. 21, 1988 [JP] Japan .................. 63-152659

[51] Int. Cl.$^5$ .................................. G11B 17/30
[52] U.S. Cl. ........................ 369/219; 369/244; 369/246
[58] Field of Search ............ 369/75.1, 75.2, 77.1, 369/77.2, 215, 219-221, 244; 360/104-109

[56] References Cited

U.S. PATENT DOCUMENTS

| 3,768,815 | 10/1973 | Mathuria | 369/261 X |
|---|---|---|---|
| 4,040,089 | 3/1977 | Guarracini | 369/219 X |
| 4,074,313 | 2/1978 | Reisner et al. | 369/219 X |
| 4,574,372 | 3/1986 | d'Alayer de Costemore d'Arc | |
| 4,628,498 | 12/1986 | Takamatsu et al. | |
| 4,677,508 | 6/1987 | Burton, Jr. et al. | 360/96.5 |
| 4,701,901 | 10/1987 | Imai | |
| 4,723,185 | 2/1988 | Maeda | |
| 4,731,775 | 3/1988 | Katsuyama et al. | 369/77.2 |
| 4,794,588 | 12/1988 | Yoshitoshi et al. | 369/247 |

FOREIGN PATENT DOCUMENTS

| 0145052 | 6/1985 | European Pat. Off. |
| 0148553 | 7/1985 | European Pat. Off. |
| 0206831 | 12/1986 | European Pat. Off. |
| 60-231966 | 11/1985 | Japan |
| 2133606 | 7/1984 | United Kingdom |

Primary Examiner—William M. Shoop, Jr.
Assistant Examiner—David Martin
Attorney, Agent, or Firm—Ronald P. Kananen

[57] ABSTRACT

A disc drive apparatus employs a locking mechanism for locking a movable base structural component to a stationary frame during disc loading and unloading operations. The locking mechanism is associated with a head drive mechanism which drives a head including a head for transferring information between a disc and the head, toward and away from the disc, so that the locking mechanism is operated between the locking position in which the movable base frame is restricted from movement relative to the stationary frame, and on unlocking positon in which the movable base frame is permitted to move relative to the stationary frame.

17 Claims, 6 Drawing Sheets

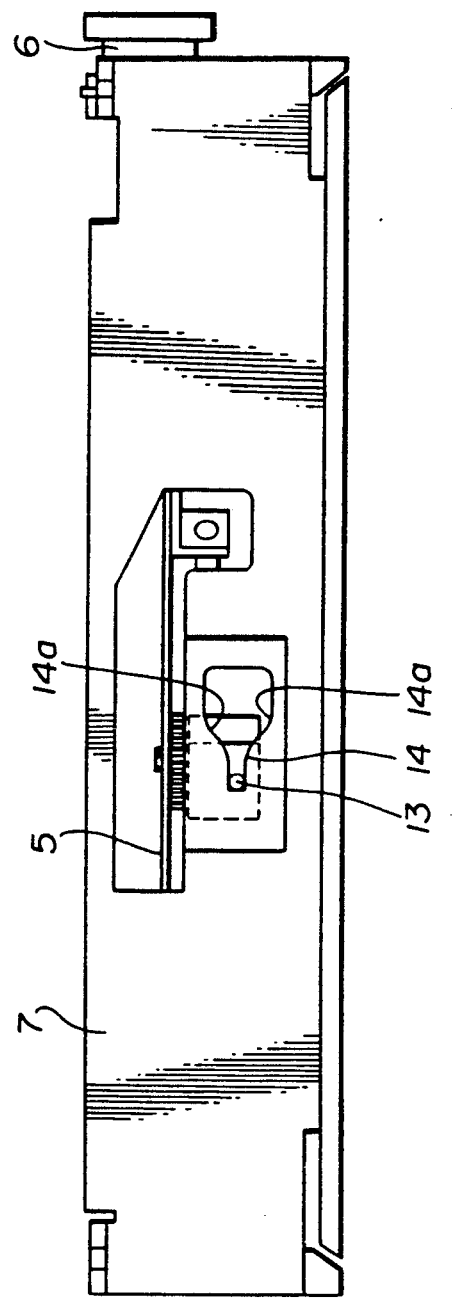

DISC DRIVE APPARATUS

BACKGROUND OF THE INVENTION

1. Field of the Invention

The present invention relates generally to a disc drive apparatus. More specifically, the invention relates to a disc drive apparatus including structure for absorbing the vibration of a stationary frame in order to protect reading and/writing mechanism from vibration transmitted from the stationary frame.

2. Description of the Background Art

One of the conventional disc which facilitates a vibration absorbing structure has been disclosed in Japanese Patent First (unexamined) Publication (Tokkai) Showa 60-231966. Such conventional disc drive apparatus has a base plate on which is mounted a pick-up as a reading and/or writing mechanism. The base plate is supported on a stationary frame via a resilient or elastic support which serves for absorbing any vibration transmitted from the stationary frame to the base plate so that the pick-up can be protected from such vibration of the stationary frame. The disclosed apparatus also has a loading mechanism including a disc receptacle opening and a disc feeding mechanism for transferring a disc between a loading position and unloading position. In the disclosure, the disc feeding mechanism comprises a pair of feed rollers. The feeding rollers comprises a stationary roller stationarily supported on the stationary frame and a movable roller mounted on a pivotal arm. The pivotal arm is pivotable between an active position, at which the movable roller is shifted to a position for gripping the disc between the stationary roller so as to feed to the disc to one of a loading or unloading position, and an inactive position to place the movable roller away from the disc so as to permit the disc to be rotatingly driven by means of a known disc drive mechanism. The movable roller is also associated with a driving motor via the gear train to be driven by the driving torque transmitted therethrough when the pivotal arm is placed at the aforementioned active position. The pivotal arm is associated with an actuation mechanism which drives the pivotal arm between the active and inactive positions. The actuation mechanism is designed to be commonly driven by the driving motor which drives the movable roller.

In addition, during the disc loading and unloading operations, it is necessary to lock the base plate, which is oscillably mounted on a stationary frame via vibration damping members, to the stationary member so as to restrict movement of the base plate. For this, a locking lever is provided which locks the base plate onto the stationary frame. The locking lever is mechanically associated with the driving motor to be driven to the locking position, maintained at the locking position during the loading and unloading operation, and released from the locking position after completing the loading or unloading operation.

With the construction set for above, it is the conventional practice to perform the loading and unloading operation in such a way that a plunger is activated in response to insertion of a disc for releasing the pivotal arm from locked condition, where the pivotal arm is locked at a position away from the stationary roller. Simultaneously, by the action of the plunger, the locking lever is operated to the locking position for restricting movement of the base plate relative to the stationary frame. By further insertion of the disc to place the disc between the movable and stationary rollers, the driving motor becomes active to drive the movable roller. After the disc is placed at the loading position and chucked on the turntable, the plunger is turned to an inactive position to operate the locking lever to the unlocking portion to permit the base plate to move relative to the stationary frame.

In order to enable the driving motor to drive both of the movable roller and the pivotal arm commonly, a complex construction of the drive mechanism has had to be provided. Namely, in order to perform disc loading and unloading operation and locking operation at their respective desired timing, operation timing of the respective components of the disc drive apparatus has had to be mechanically controlled. This requires complex configuration of components and additional components. Furthermore, because of complex construction, it is difficult to mechanically adjust the operational timings of respective components.

SUMMARY OF THE INVENTION

Therefore, it is an object of the present invention to provide a disc drive apparatus which can perform disc loading and unloading operations together with base plate locking operation with a simplified construction.

In order to accomplish the aforementioned and other objects, a disc drive apparatus, according to the present invention, employs a locking mechanism for locking a movable base structural component to a stationary frame during the disc loading and unloading operation. The locking mechanism is associated with a head drive mechanism which drives a head including a head for transferring information between a disc and the head, toward and away from the disc, so that the locking mechanism is operated between the locking position in which the movable base frame is restricted from movement relative to the stationary frame, and unloading position in which the movable base structural component is permitted to move relative to the stationary frame.

According to one aspect of the invention, a disc drive apparatus is disclosed which comprises:

a base plate, on which means for rotatingly driving a disc is provided;

a stationary frame supporting the base plate through a vibration damping means;

a head for transferring information between the disc and the head;

means for driving the head along the radial direction of the disc being driven by the disc driving means, the head driving means including a motor for driving the head; and locking means for movable between a locking position for restricting movement of the base plate relative to the stationary frame and an unlocking position for permitting movement of the base plate relative to the stationary frame, the locking means being cooperative with the head driving means to be operated between the locking position and unlocking position by the motor of the head driving means.

According to another aspect of the invention, a disc drive apparatus is disclosed which comprises:

a base plate, on which means for rotatingly driving a disc is provided;

a stationary frame supporting the base plate via a vibration damping means;

a head for transferring information between the disc and the head;

means for driving the head along the radial direction of the disc being rotatingly driven by the disc driving means, the head driving means being active during the disc loading and unloading operation and including a motor for driving the head with respect to an orientation of the disc driving means in synchronism with the disc loading and unloading operation; and locking means for moving between a locking position for restricting movement of the base plate relative to the stationary frame and an unlocking position for permitting movement of the base plate relative to the stationary frame, the locking means being cooperative with the head driving means to be operated between the locking position and unlocking position by the motor of the head driving means in synchronism with movement of the head.

In the preferred construction, a disc drive apparatus may further comprise a link mechanism interposed between the locking means and the head driving means for operating the locking means between the locking and unlocking position according to the position of the head. The head driving mechanism drives the head between an innermost position closest to a rotational axis of the disc and an outermost position remote from the rotational axis, and the link mechanism being responsive to the head driving means positioning the head at one of a first and second end positions, for operating the locking means at the first position. The locking means may comprise a locking lever associated with the link mechanism to be pivotally driven by the link mechanism and mounted on the base plate, the locking lever having a locking section engaging with a receptacle formed in the stationary frame for restricting movement of the base plate relative to the stationary component. In such a case, the locking section receptacle formed in the stationary frame has a first section having a configuration conforming with the locking section of the locking lever and a second section guiding the locking section into engagement with the first section when the locking means is operated from the unlocking position to the locking position.

In the alternative, the link mechanism may include a rack formed on a link and the locking lever is associated with a pinion engaging with the rack for transferring the torque of pivotal movement of the link to the locking lever for causing angular displacement between the locking position and the unlocking position. Further, the head driving means may comprise a threaded rod associated with the motor to be driven by the driving torque thereof and a threaded member carrying the head and engaging with the threaded rod to be thrustingly driven along the axis of the threaded rod. In the later case, the threaded member is disengaged from the threaded rod at the first and second end position, and the threaded member is cooperative with the link member at an orientation immediately before being disengaged from the threaded rod for driving the locking means at the locking position.

BRIEF DESCRIPTION OF THE DRAWINGS

The present invention will be fully understood from the detailed description given herebelow and from the accompanying drawings of the preferred embodiment of the invention, which, however, should not be taken to limit the invention to the specific embodiment, but are for explanation and understanding.

In the drawings:

FIG. 7 is a side elevation of the preferred embodiment of the disc drive apparatus, showing the locking member in locking position.

DESCRIPTION OF THE PREFERRED EMBODIMENT

Figure 1:
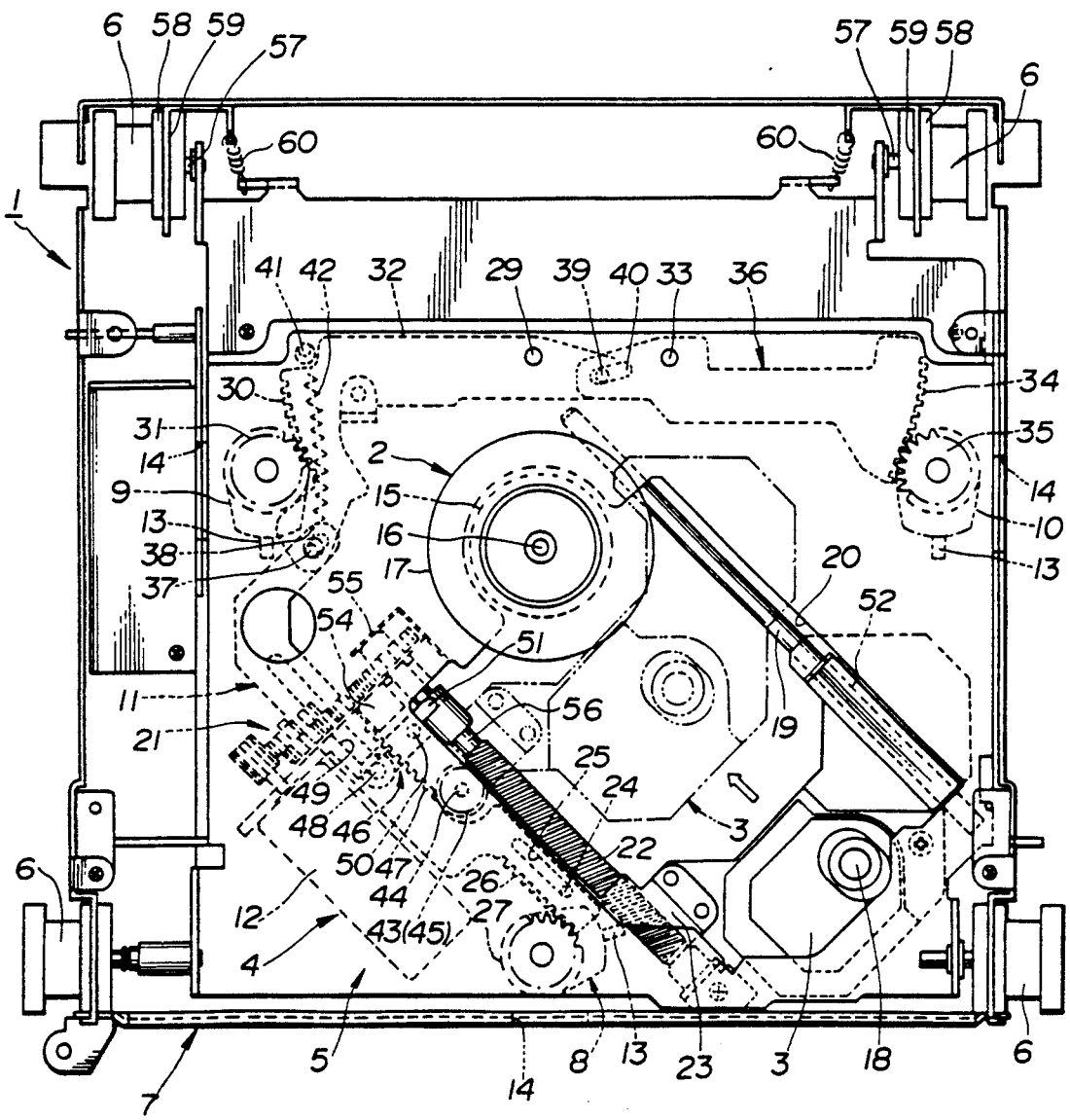
FIG. 1 p view of the preferred embodiment of a disc drive apparatus according to the present invention, in which a pick-up is shifted away from a position to load a disc.
Figure 2:
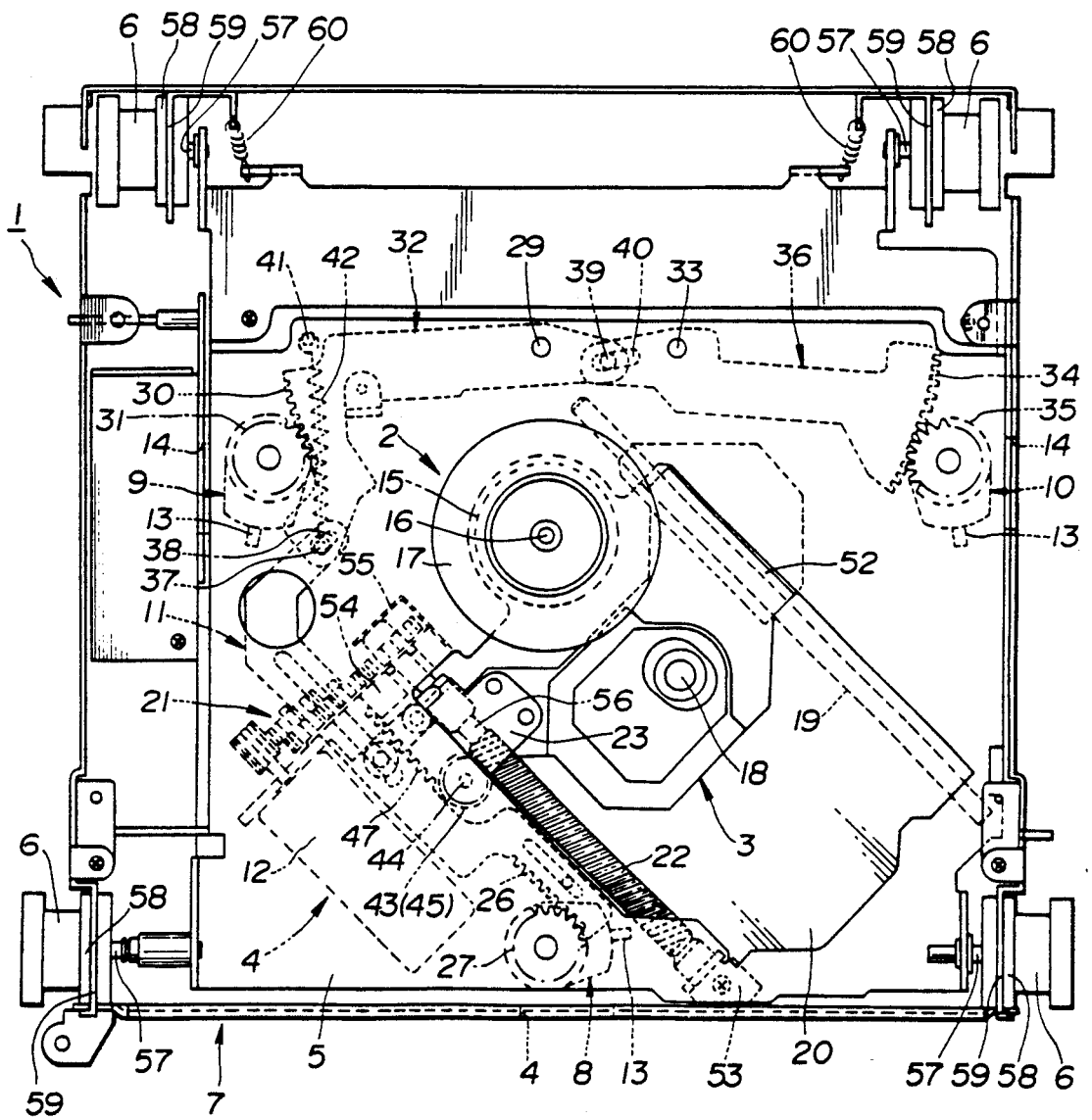
FIG. 2 is a plan view of the disc drive apparatus the same as that illustrated in FIG. 1, but showing a position in which the pick-up is shifted at a position approaching to the position to load the disc.
Figure 3:
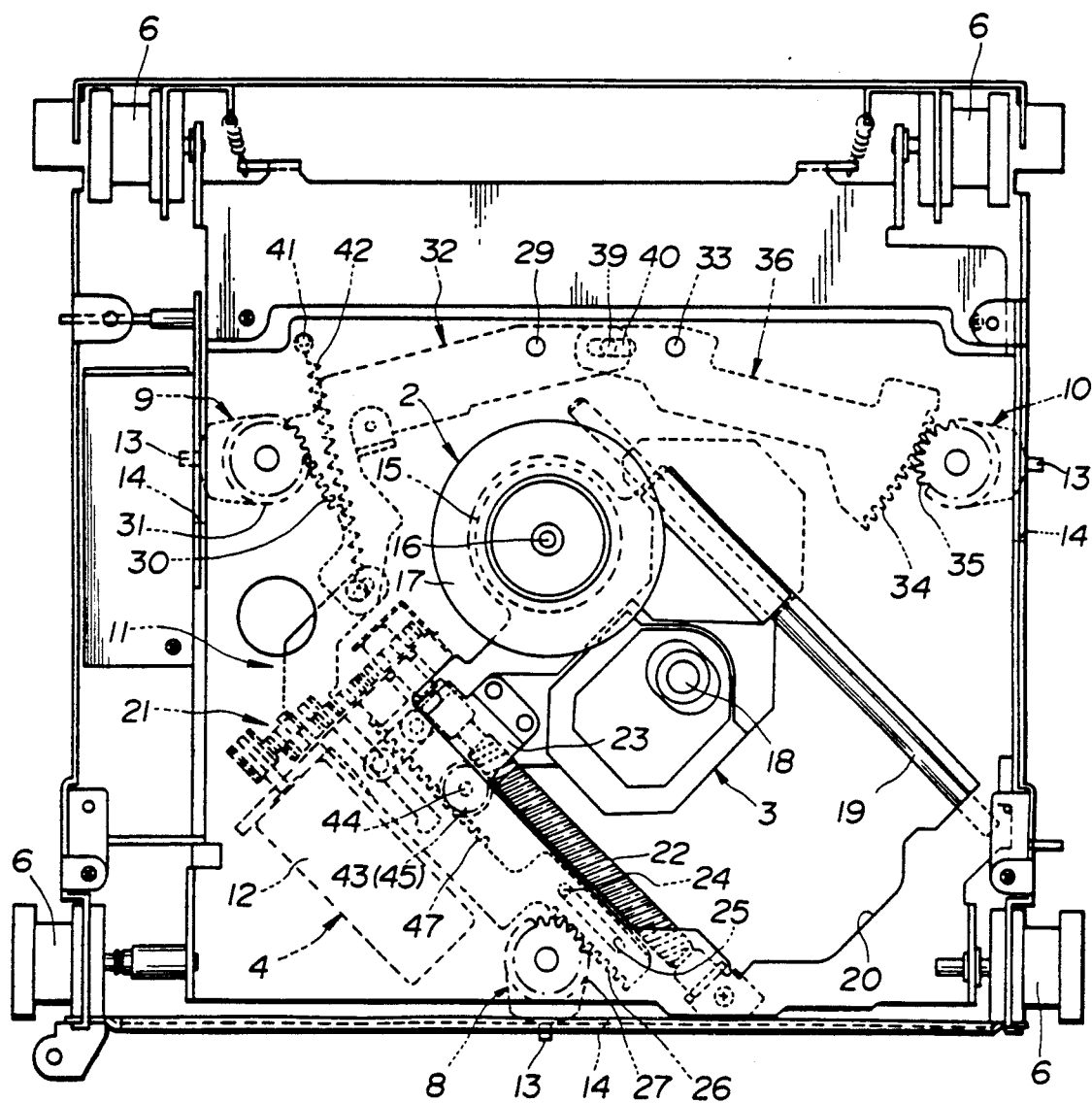
FIG. 3 is a plane view of the disc drive apparatus same as that illustrated in FIG. 1 but showing a position in which a locking member is placed at locking position.

Referring now to the drawings, particularly to FIGS. 1 through 3, the preferred embodiment of a disc drive apparatus 1, according to the present invention, has a disc loading section 2, a pick-up 3 and a pick-up drive mechanism 4. The disc loading section 2, the pick-up 3 and the pick-up drive mechanism 4 are mounted on a base plate 5. The base plate 5 is supported on a stationary frame 7 through a vibration damping member 6. The vibration damping member disclosed in U.S. Pat. No. 4,794,588 may be applicable for the shown construction of the disc drive apparatus, for example. The disclosure of the above-identified U. S. Patent will be herein incorporated by reference for the sake of disclosure. The base plate 5 is selectively coupled with the stationary frame 7 by means of locking member 8, 9 and 10. These locking members 8, 9 and 10 are associated with a lock control mechanism 11. The lock control mechanism 11 is cooperates with the pick-up drive mechanism 4 so that, when an electric motor 12 of the pick-up drive mechanism 4 is driven in one driving direction for shifting the pick-up 3, the locking members 8, 9 and 10 are rotated to establish engagement of locking pins 13 with locking pin receptacle 14 of the stationary frame 7 in order to fix the base plate 5 to the stationary frame 7.

The disc loading section 2 comprises a spindle motor 15, a drive shaft 16 of the spindle motor and a turn table 17. The spindle motor 15 is mounted on the lower surface of the stationary frame 7. The drive shaft 16 of the spindle motor 15 extends upwardly through the stationary frame 7. The drive shaft 16 is coupled with the turn table 17 which is oriented above the base plate 5.

The pick-up 3 employed in the shown embodiment of the disc drive apparatus, comprises an optical pick-up for optically reading information recorded on an optical disc, such as a known compact disc (CD). The pick-up has an object lens 18. The pick-up 3 scans an optical beam on the optical disc through the object lens 18 for reading the recorded information. The pick-up 3 is movable along a guide rail 19 which is mounted on the base plate 5. The guide rail 19 extends along in the radial direction of the optical disc loaded on the turn table 17.

An essentially rectangular slot 20 is provided on the base plate to expose the pick-up therethrough.

Figure 4:
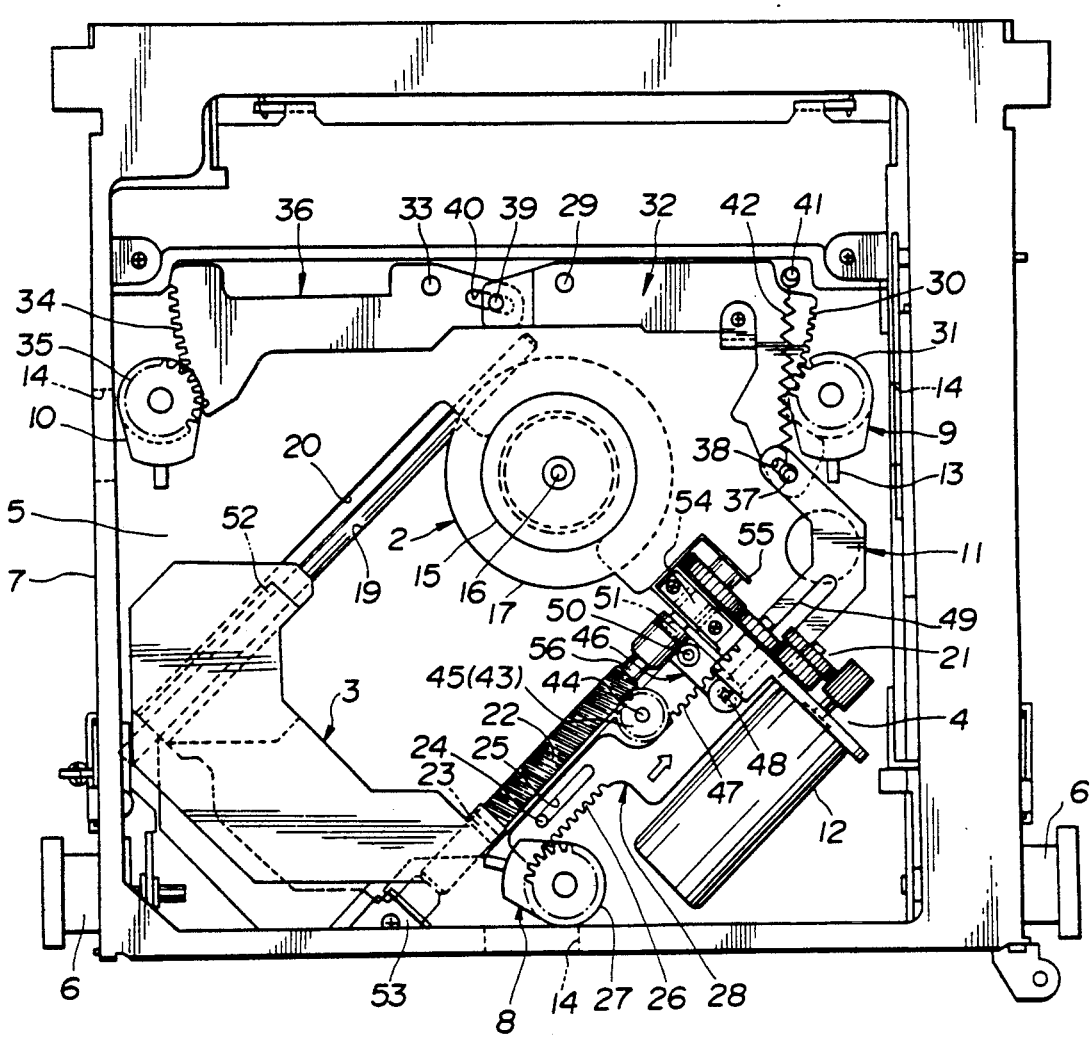
FIG. 4 is a bottom view of the preferred embodiment of the disc drive apparatus in the condition of FIG. 1.
Figure 5:
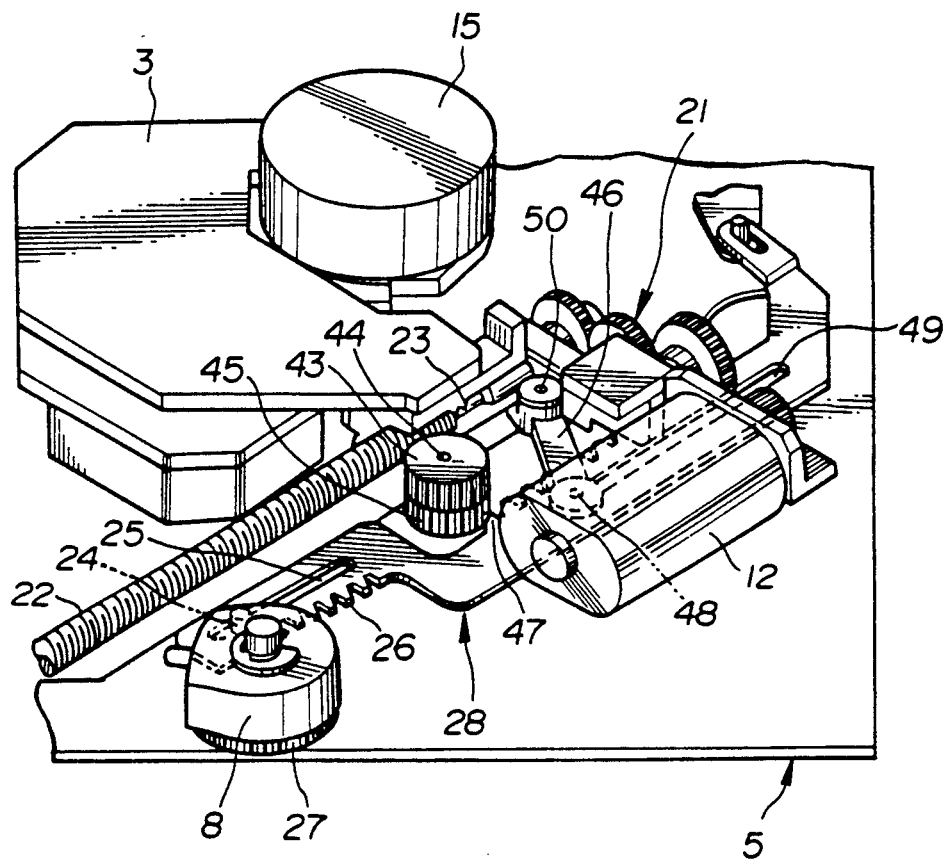
FIG. 5 is a partial perspective view of the major part of the preferred embodiment of the disc drive apparatus as view the bottom.
Figure 6:
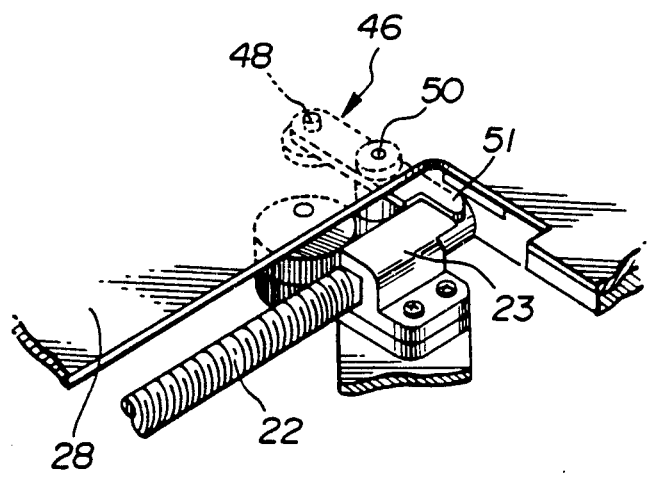
FIG. 6 is a partial perspective view of the major part of the preferred embodiment of the disc drive apparatus as view the top.

As shown in FIG. 4, the pick-up drive mechanism 4 comprises the electric motor 12. The electric motor 12 is arranged below the base plate 5. A reduction gear train 21 is associated with the electric motor 12 for transmitting the driving torque of the electric motor to a male screw rod 22. A movement 23 with a female screw is engaged with the male screw rod 22 to be driven by the latter for axial movement. Namely, when the male screw rod 22 is driven by means of the electric motor 12 via the reduction gear train 21, the movement 23 engages the female screw thereof with the male screw of the male screw rod 22 and thus is driven along the axis of the male screw rod. The movement 23 is rigidly connected to the pick-up 3 set forth above, for causing shifting of the latter with respect to the disc loading section. Namely, when the male screw rod 22 is driven in one rotational direction, the movement 23 is driven to shift in a direction away from the disc loading section with carrying the pick-up 3. This driving direction will be hereafter referred to as the "outward direction". On the other hand, when the male screw rod 22 is driven in the other rotational direction opposite the outward direction, the movement 23 with the pick-up 3 is shifted in a direction opposite to the outward direction for approaching the disc loading section. This direction will be hereafter referred to as the "inward direction". At the end of the stroke of the movement 23 in the outward and inward directions, the female screw thereof is released from engagement with the male screw of the male screw rod 22 so that the further rotation of the male screw rod 22 may not cause further shifting of the movement. These end positions of the movement will be hereafter referred to respectively to the "outer end position" and "inner end position".

The lock control mechanism 11 has a first locking lever 28. The first locking lever 28 has an elongated hole 25 which engages a guide pin 24 extending from the base plate 5. Therefore, the first locking lever 28 is slidable along the axis of the elongated hole 25 as guided by the guide pin 24. The first locking lever 28 is formed of rack 26 which is meshed with a pinion 27 provided with the locking member 8. The lock control mechanism 11 also has a second locking lever 32 which is pivotally mounted on the base plate 5 via a pivot pin 29. The second locking lever 32 is formed with an arc shaped rack 30. The arc shaped rack 30 is engaged with a pinion 31 of the locking member 9. A third locking lever 36 is further provided with the lock control mechanism 28. The third locking lever 36 is pivotally mounted on the base plate 5 via a pivot pin 33. The third locking lever 36 is formed of a rack 34 which engages a pinion 35 of the locking member 10.

The first locking lever 28 and the second locking lever 32 cooperativity each other for permitting relative pivotal movement by means of a connecting pin 37 and a pin receptacle opening 38. Similarly, the second locking lever 32 and the third locking lever 36 cooperated with each other for permitting relative pivotal movement by means of a connecting pin 39 and a connecting pin receptacle opening 40. To the connecting pin 37, one end of a coil spring 42 is engaged. The other end of the coil spring 42 is engaged to the base plate 5 via a engaging pin 41 which is extended from the base plate. The coil spring 42 thus exerts a tension force on the connecting pin 37 so as to constantly exert a clockwise direction (in FIGS. 1 through 3) bias force on the second locking lever 32. This bias force of the coil spring 42 thus assures a meshing engagement between the arc shaped rack 30 and the pinion 31. Since the second locking lever 32 is coupled with the third locking lever 36 via the connecting pin 39 and the pin receptacle opening 40, the spring force of the coil spring 42 acts on the third locking lever 36 for causing pivotal movement in a counterclockwise direction in FIGS. 1 through 3. Also, the clockwise pivotal movement of the second locking lever 32 exerts the spring force of the coil spring 42 via the pin-and-opening intersection between the first locking lever 28 for causing the latter to shift to the upper left in FIGS. 1 through 3.

When the first locking lever 28 is shifted in lower right direction against the biasing force of the coil spring 42, the rack 26 formed in the first locking lever 28 rotatingly drive pinion 27 in clockwise direction in FIGS. 1 through 3. Following the clockwise rotation of the pinion 28, the locking member 8 is driven to pivotally shift in a clockwise direction to establish engagement between the locking pin 13 with the locking pin receptacle hole 14 formed through the stationary frame 7. At this time, in response to the sliding movement of the first locking lever 28 against the spring force of the coil spring 42, the second locking lever 32 is pivotally driven in a counterclockwise direction. Counterclockwise pivotal movement of the second locking lever 32 drives the pinion 31 in a clockwise direction in FIGS. 1 through 3 via the rack 30. According to the clockwise rotation of the pinion 31, the locking member 9 is pivoted in a clockwise direction to cause engagement between the pin 13 with the pin receptacle hole 14 of the stationary frame 7. Furthermore, the counterclockwise pivotal movement of the second locking lever 32 causes a pivotal movement of the third locking lever 36 in a clockwise direction. This causes the counterclockwise rotation of the pinion 35 together with the locking member 10 via the rack 34 to establish locking engagement between the pin 13 of the locking member 10 with the pin receptacle hole 14 of the stationary frame 5. Therefore, at the three points where the locking members 8, 9 and 10 are provided, locking engagement between the locking pin 13 and the locking pin receptacle hole 14 can be established for locking the base plate 5 to the stationary frame 7.

It should be appreciated, because the base plate 5 has to be firmly locked to the stationary frame 7, it is essential to establish firm engagement between the locking pins 13 and the locking pin receptacle holes 14. In order to achieve this while permitting smooth engagement and disengagement between the pin 13 and the hole 14, the locking pin receptacle hole 14 is configurated as shown in FIG. 7. As will be clear from FIG. 7, the locking pin receptacle hole 14 is provided with a wide section 14b and a narrow section 14c connected to each other via a transition section 14d which has a tapered edge. The wide section 14b is oriented at the leading side with respect to the direction of movement of the locking pin 13 so that the locking pin entering into the locking pin receptacle hole 14 initially enters into the wide section 14b and then is transferred into the narrow section 14c via the transition section 14d.

As shown in FIG. 4, a helical gear 43 is rotatably supported on the lower surface of the base plate 5 for rotation about a gear shaft 44. A pinion gear 45 is also supported beneath the base plate 5 by the common gear shaft 44. The pinion gear 45 is associated with a rack 47 formed in one side 12 of the first locking lever 28 via a link lever 46. The link lever 46 is provided with a pin 48 which is projected upwardly from one end of the link level. The pin 48 engages with an elongated opening 49 formed in the first locking lever 28. The other end of the link lever 46 is pivotally supported by means of a pivot pin 50 extending from the lower surface of the base plate 5.

When the male screw rod 22 is driven to rotate in one direction to cause shifting of the movement 23 with the pick-up 3 to the inner end position, the tip end of the link lever 46 comes into contact with the leading edge of the movement 23 immediately before the engagement between the male screw of the male screw rod 22 and the female screw of the movement is released. The link lever 46 is thus pushed by the movement 23 for causing pivoting movement about the pivot 50 to cause pivotal movement in a clockwise direction in FIG. 4. Clockwise pivotal movement of the link lever 46 causes the engagement of the pin 48 is contact with one longitudinal end edge of the elongated opening 49 to force the first locking lever 28 to shift in a direction opposite to the direction indicated by the arrow, for establishing engagement between the rack 47 and the pinion gear 45.

As shown in FIG. 4, the pick-up 3 is associated with the guide rail 19 via a guide bushing 52. On the other hand, the male screw rod 22 is rotatably supported on the base plate 5 by means of bearings 53 and 54 at both ends thereof. In the vicinity of both ends, the male screw rod 22 is formed with non-threaded cylindrical sections 56 so that the engagement between the male screw and the female screw of the male screw rod 22 and the movement 23 respectively, can be released when the movement 23 is moved to the outer or inner end position. The male screw rod 22 is restricted in thrusting movement by means of a retainer spring 55.

The vibration damping member 6 comprises a fluid damper which comprises a hollow damper body filled with a working fluid, such as a silicon oil and formed into cylindrical configuration to define therethrough a pin receptacle opening for receiving positioning pins 57 extending from the base plate 5. The vibration damping member 6 is provided with a flange section 58. The flange section 58 is designed to engage with a flange section 59 of the stationary frame 7 so that the base plate 5 can be rigidly fixed to the stationary frame. Coil springs 60 are also provided for fixing the base plate 5 on the stationary frame 7 in cooperation with the vibration damping members 6.

Furthermore, though it is not illustrated in the drawings, the preferred embodiment of the disc drive apparatus has a per se known construction of disc holder with pivotal arms for carrying the optical disc between loading position and eject position. The disc holder with the pivotal arm may be associated with a movable roller, a loading motor and so forth for forming a disc loading mechanism. Because such a loading mechanism is known in the art, the detailed construction and operation is neglected from the disclosure and drawings in order to avoid confusion in understanding the present invention.

The shown embodiment of the disc drive apparatus, according to the present invention and constructed as above, is applicable for a front loading type disc drive which has a disc insertion mouth on the front end of a cabinet. As is known in the art, insertion of the disc is detected by means of a detector switch to start driving of the loading motor. The loading motor when started, drives a movable roller for feeding the disc inserted into the disc insertion mouth into the interior of the cabinet and to the disc loading section 2. At the same time, the electric motor 12 of the pick-up drive mechanism 4 is started to drive the male screw rod 22 for shifting the movement 23 with the pick-up 3 to the inner end position. When the movement 23 and the pick-up 3 reaches the inner end position and before driving engagement between the male screw of the male screw rod 22 and the female screw of the movement 23 is released, the movement 23 comes into contact with the tip end of the link lever 46 for causing pivotal movement of the latter. According to pivotal movement of the link lever 46, the first locking lever 28 is shifted against the spring force of the spring 42 to establish engagement between the rack 47 thereof and the pinion gear 45 provided beneath the helical gear 43 for rotation therewith. At this time, since the pinion gear 45 is rotatingly driven by the driving torque of the electric motor 12 transmitted through the male screw rod 22 and the helical gear 43 which is meshing with the male screw rod, the pinion gear 45 drives the first locking lever 28 for shifting.

According to shifting of the first locking lever 28, the second and third locking levers 32 and 36 are pivotally driven. As set forth, pivotal movements of the second and third locking levers 32 and 36 and thrusting movement of the first locking lever 28, cause the locking pins 13 of respective of locking members 8, 9 and 10 to engage with the associated locking pin receptacle holes 14. By this, the base plate 5 can be firmly installed to the stationary frame 7. After this, the pivotal arm is driven by the loading motor downwardly to allow a known chucking mechanism of the disc drive mechanism to chuck the disc.

After disc chucking is completed, the electric motor 12 of the pick-up drive mechanism is driven in a reverse direction (opposite to the driving direction for loading the disc). By driving of the electric motor 12 in reverse direction, the locking members 8, 9 and 10 are driven in opposite directions to those for fixing the base plate 5 onto the stationary frame 7. This causes the release of the locking pins 13 from the locking pin receptacle holes 14. By this action, the base plate 5 becomes movable relative to the stationary frame 7. Simultaneously, the rack 47 of the first locking lever 28 becomes free from engagement with the pinion gear 45. By this action, the spring force of the spring 42 acts on the movement 23 via the first locking lever 28 and the link lever 46 to establish driving engagement between the male screw and female screw of the male screw rod 22 and the movement 23, respectively. This enables the male screw rod 22 to drive the movement 23 with the pick-up toward out side so as to perform reading and/or writing information on the optical disc.

Upon the unloading of the optical disc from the loaded condition, the electric motor 12 is of the pick-up drive mechanism 4 is driven to drive the male screw rod 22 for shifting the movement 23 with the pick-up 3 to the inner end position. Similarly to the above, the movement 23 depresses the tip end 51 of the link lever 46 for causing pivotal movement of the latter. This causes movement of the locking members 8, 9 and 10 to bring the locking pins 13 into engagement with the locking pin receptacle holes 14. Thus, the base plate 5 is firmly fixed to the stationary frame 7. After this, the loading motor is driven in an unloading direction to release the optical disc from the disc loading section 2 and eject it from the front mouth of the cabinet.

As will be appreciated herefrom, the shown embodiment achieves 11 of the objects and advantages sought therefor While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claim..

It should be noted that though the shown embodiment employs three locking members for locking the base plate to the stationary frame, the number of the locking members is not essential for the present invention. Furthermore, the configuration and operation of the locking members and the associated lock control mechanism can be designed in any way.

In addition, though the shown embodiment has concentrated on the loading and unloading mechanism of the optical disc drive apparatus, the technology herein disclosed is applicable of all type of discs handled by disc drive apparatus of the type disclosed herein.

What is claimed is:

1. A disc drive apparatus comprising:
   a base plate, with which means for rotatingly driving a disc is provided;
   a stationary frame supporting said base plate through a vibration damping means;
   a head for transferring information between said disc and said head;
   means for driving said head along a radial direction of said disc driven by said disc driving means, said head driving means including a motor for driving said head; and
   locking means movable between a locking position for restricting movement of said base plate relative to said stationary frame and an unlocking position for permitting movement of said base plate relative to said stationary frame, said locking means mechanically cooperating with said head driving means to be operated between said locking position and said unlocking position by said motor of said head driving means.

2. A disc drive apparatus as set forth in claim 1, which further comprising a link mechanism interposed between said locking means and said head driving means for operating said locking means between said locking and unlocking position according to the position of said head.

3. A disc drive apparatus as set forth in claim 2, wherein said head driving mechanism drives said head between an innermost position and an outermost position, and said link mechanism being responsive to said head driving means positioning said head at one of said first and second end positions for operating said locking means to a locking position at said first position.

4. A disc drive apparatus as set forth in claim 3, wherein said locking means comprises a locking lever associated with said link mechanism to be pivotally driven by said link mechanism and mounted on said base plate, said locking lever having a locking section engaging with a receptacle formed in said stationary frame for restricting movement of said base plate relative to said stationary component.

5. A disc drive apparatus as set forth in claim 4, wherein said locking section receptacle formed in said stationary frame has a first section having a configuration conforming with said locking section of said locking lever and a second section guiding said locking section into engagement with said first section when said locking means is operated from said unlocking position to said locking position.

6. A disc drive apparatus as set forth in claim 4, wherein said link mechanism includes a rack formed on a link and said locking lever is associated with a pinion engaging with said rack for transferring torque from the pivotal movement of said link to said locking lever for causing angular displacement between said locking position and said unlocking position.

7. A disc drive apparatus as set forth in claim 4, wherein said head driving means comprises a threaded rod associated with said motor to be driven by the driving torque output of said motor and a threaded member carrying said head and engaging with said threaded rod to be thrustingly driven along the axis of said threaded rod.

8. A disc drive apparatus as set forth in claim 7, wherein said threaded member is disengaged from said threaded rod at said first and second end positions, and said threaded member is cooperative with said link member at an orientation immediately before being disengaged from said threaded rod for driving said locking means to said locking position.

9. A disc drive apparatus comprising:
   a base plate, with which means for rotatingly driving a disc is provided;
   a stationary frame supporting said base plate through a vibration damping means;
   a head for transferring information between said disc and said head;
   means for driving said head along a radial direction of said disc driven by said disc driving means, said head driving means being active during disc loading and unloading operations and including a motor for driving said head with respect to said disc in synchronism with disc loading and unloading operations; and
   locking means movable between a locking position for restricting movement of said base plate relative to said stationary frame and an unlocking position for permitting movement of said base plate relative to said stationary frame, said locking means mechanically cooperating with said head driving means to be operated between said locking position and unlocking position by said motor of said head driving means in synchronism with movement of said head.

10. A disc drive apparatus as set forth in claim 9, which further comprises a link mechanism interposed between said locking means and said head driving means for operating said locking means between said locking and unlocking position according to the position of said head.

11. A disc drive apparatus as set forth in claim 10, wherein said head driving mechanism drives said head between a first end position closest to a rotational axis of said disc and a second end position remote from said rotational axis, and said link mechanism being responsive to said head driving means positioning said head at one of said first and second end positions for operating said locking means to a locking position at said first position.

12. A disc drive apparatus as set forth in claim 11, wherein said locking means comprises a locking lever associated with said link mechanism to be pivotally driven by said link mechanism and mounted on said base plate, said locking lever having a locking section engaging with a receptacle formed in said stationary frame for restricting movement of said base plate relative to said stationary component.

13. A disc drive apparatus as set forth in claim 12, wherein said locking section receptacle formed in said stationary frame has a first section having configuration conforming with said locking section of said locking lever and a second section guiding said locking section into engagement with said first section when said locking means is operated from said unlocking position to said locking position.

14. A disc drive apparatus as set forth in claim 12, wherein said link mechanism includes a rack formed on a link and said locking lever is associated with a pinion engaging with said rack for transferring torque from the pivotal movement of said link to said locking lever for causing angular displacement between said locking position and said unlocking position 15. A disc drive apparatus as set forth in claim 12, wherein said head driving means comprises a threaded rod associated with said motor to be driven by the driving torque output at said motor and a threaded member carrying said head and engaging with said threaded rod to be thrustingly driven along the axis of said threaded rod.

16. A disc drive apparatus as set forth in claim 15, wherein said threaded member is disengaged from said threaded rod at said first and second end positions, and said threaded member cooperates with said link member at an orientation immediately before being disengaged from said threaded rod for driving said locking means to said locking position.

17. A disc drive apparatus comprising:
a base plate with which means for rotatingly driving a disc are provided;
a stationary frame supporting said base plate through a vibration damping means;
a head for transferring information between a disc and said head;
means for driving said head along a path extending radially outwards from the center of a disc loaded in said disc drive apparatus, said path having a first position closest to the center of said loaded disc;
locking means movable between a locked position which locks said base plate to said chassis, and an unlocked position permitting relative movement between said base plate and said chassis through said vibration damping means,
wherein said means for driving activates said locking means to said locked position when said means for driving moves said head to said first position.

* * * * *